June 28, 1927.  1,634,215
L. ROSENFELD
BOTTLE WASHING AND STERILIZING APPARATUS
Filed Jan. 27, 1927   2 Sheets-Sheet 1
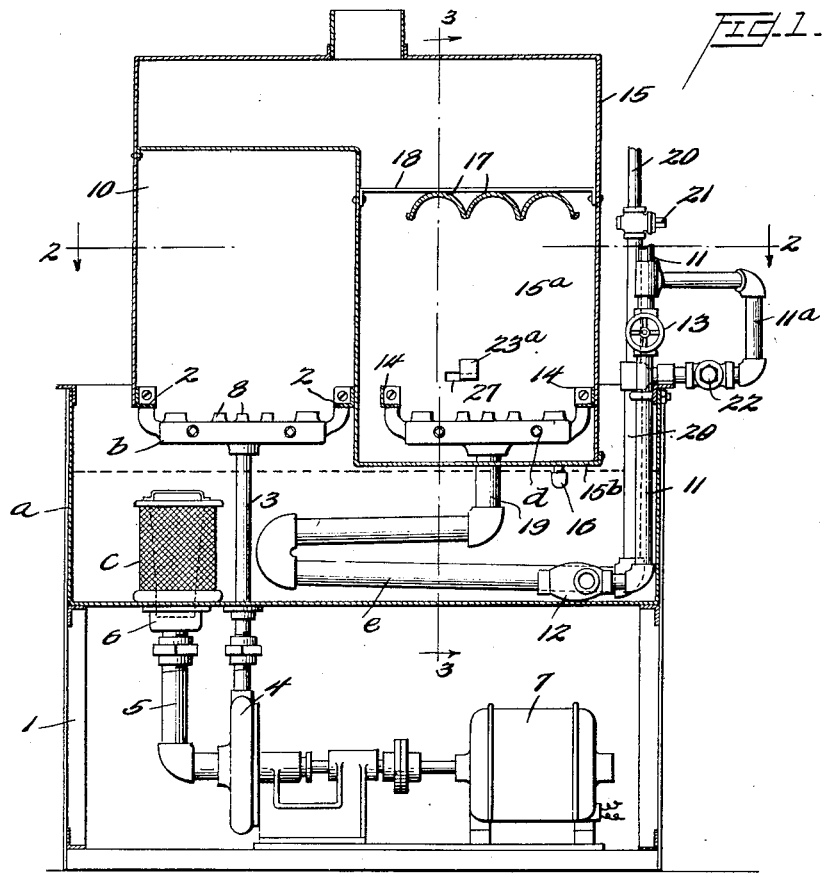
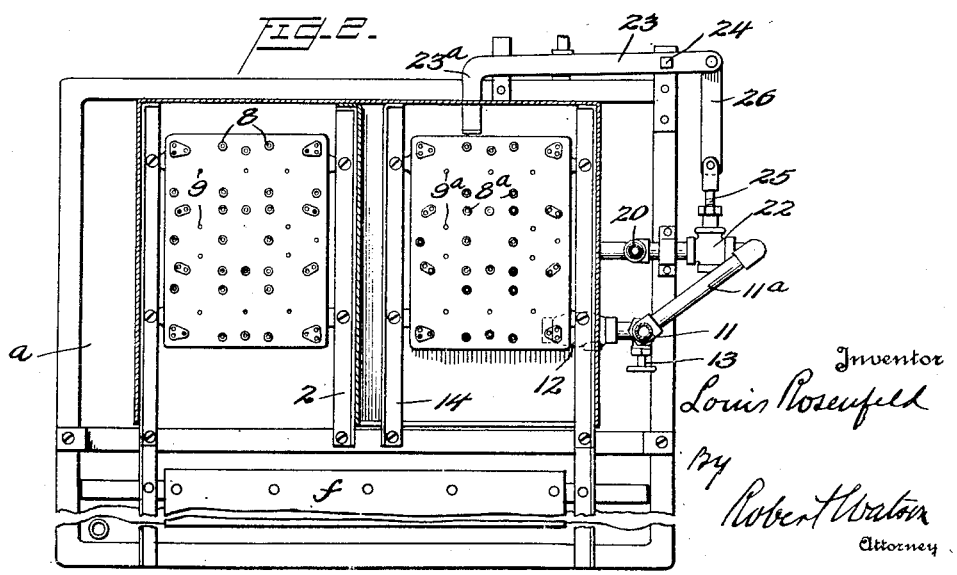
Inventor
Louis Rosenfeld
By Robert H Watson
Attorney June 28, 1927.
L. ROSENFELD
1,634,215
BOTTLE WASHING AND STERILIZING APPARATUS
Filed Jan. 27, 1927 2 Sheets-Sheet 2
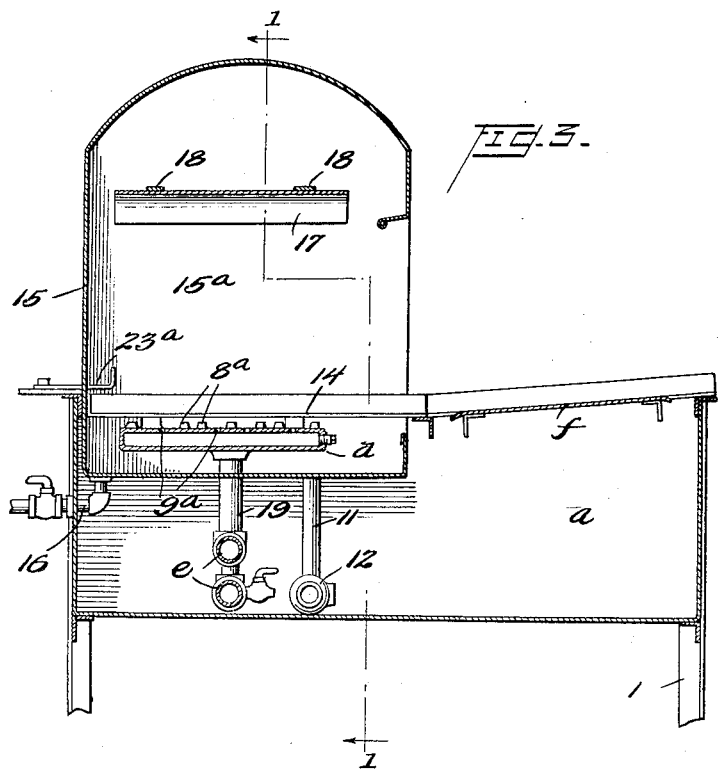
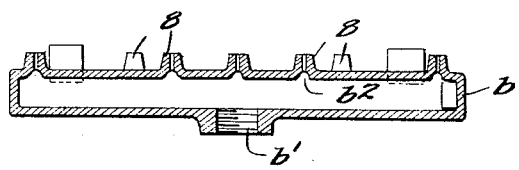

Patented June 28, 1927.

1,634,215

UNITED STATES PATENT OFFICE.

LOUIS ROSENFELD, OF BALTIMORE, MARYLAND, ASSIGNOR TO CHERRY-BASSETT COMPANY, OF BALTIMORE, MARYLAND, A CORPORATION OF DELAWARE.

BOTTLE WASHING AND STERILIZING APPARATUS.

Application filed January 27, 1927. Serial No. 163,857.

This invention relates to machines for washing, rinsing and sterilizing bottles. In carrying out the invention, I provide a tank adapted to contain a washing solution, consisting of water containing an alkali, and means for forcing this solution constantly through a spray head over which the bottles to be cleaned are held in inverted position, in crates. This solution is forcibly sprayed into the bottles and also against the top of a housing which extends over the bottles, from whence it flows downwardly over the outer sides of the bottles and cleans the same. The cleaning fluid issuing from the spray head falls back into the tank and is used over again. After the bottles in the crate have been cleaned, they are placed over a rinsing spray head and sprayed with clean water from a source outside the tank, and then subjected to the sterilizing action of steam. This rinsing spray head is connected to a closed coil or chamber submerged in the tank, to which is also connected a water pipe leading from a suitable source of supply. The water is allowed to flow slowly into the coil or chamber, so that this chamber will fill in a half minute or so, and when a crate of bottles is placed upon the rinsing spray head, the crate opens a valve in the steam pipe and admits steam to the chamber. This steam forcibly ejects the water from the chamber through the rinsing spray head into and around the bottles, and the steam then flows through the latter head to sterilize the bottles. The steam passing through the coil or chamber supplies the necessary heat to the washing solution in the tank. When the crate is removed from the rinsing head, the steam valve automatically closes and the submerged chamber then fills with rinsing water, which absorbs heat from the liquid in the tank. The liquid in the tank is preliminarily heated by steam, and thereafter, the liquid issuing from both spray heads is heated by the steam which is admitted to the closed chamber to force the rinsing fluid from the rinsing head.

In the accompanying drawing,

Fig. 1 is a vertical section through the apparatus, taken on the line 1—1 of Fig. 3;

Fig. 2 is a horizontal section taken on the line 2—2 of Fig. 1;

Fig. 3 is a longitudinal section taken on the line 3—3 of Fig. 1; and

Fig. 4 is a central transverse section through one of the spray heads.

Referring to the drawing, $a$ represents a tank for containing a washing solution, which tank is supported upon a suitable frame 1. A washing spray head $b$ is supported over the tank by angle irons 2, and this spray head is connected by a pipe 3 to the pressure side of a rotary pump 4, arranged beneath the tank. The pipe 5 extends from the inlet side of the pump to an outlet fitting 6, in the bottom of the tank, over which is placed a strainer $c$, within the tank. The pump is operated by an electric motor 7, and when the washing apparatus is being used this motor runs constantly and the pump draws the washing solution from the tank and forces it through nipples 8 and perforations 9 in the spray head $b$. The nipples are arranged so that when the crate of inverted bottles is placed over the head, a nipple will extend into the mouth of each bottle, while the perforations 9 will not be covered by the bottles. The nipples are spaced so that they will spray into either quart or pint bottles. As shown in the section, Fig. 4, the spray head consists of a flat hollow metal body, having a central opening $b'$ for receiving the pipe 3, and the nipples have tapering or countersunk recesses $b^2$, to facilitate the flow of liquid into and through the orifices in the nipples. A housing 10 extends over the spray head, this housing forming a compartment within a larger housing 15. When a crate of inverted bottles is placed upon the spray head, the interiors of the bottles will be washed by the spray issuing through the nipples, and the spray from the perforations 9 will pass upwardly between the bottles and strike the top of the housing and then fall down over the outer sides of the bottles, to wash the same. This housing is not provided with a bottom and the sprayed liquid drips back into the tank, to be used over again.

The liquid in the tank is preliminarily heated by the admission of steam from a steam pipe 11 to a nozzle 12, which is submerged in the tank. A valve 13 is provided in the steam pipe for cutting off the steam after the water has been brought up to a suitable temperature. Thereafter the washing solution is kept at the desired temperature by the means hereinafter described.

After the bottles have been washed by placing them over the washing spray head $b$, the crate containing the bottles is removed from said spray head and placed over a similar spray head $d$, which is mounted upon angle irons 14 within a compartment 15ᵃ in the housing 15. This compartment has a bottom 15ᵇ which prevents the water sprayed into the housing from dripping back into the tank, and it is provided with a drain pipe 16, through which the sprayed water may flow out of the compartment. Deflectors 17, in the form of inverted gutters, are supported above the spray head $d$ by cross-pieces 18, and these deflectors serve to spread the water issuing through the perforations 9ᵃ so that it may drip over all parts of the exteriors of the bottles and rinse their outer sides. A conduit $e$ is submerged within the tank $a$ and one end of the coil is connected by a pipe 19 to the spray head $d$. The other end of the coil is connected to a water pipe 20, which leads from a source of fresh water supply, as the mains of a municipal water system. A valve 21 is arranged in the water supply pipe, and in the operation of the washer this valve is set so that water, in restricted quantity, may constantly flow into the coil $e$, to fill the same, the rate of flow being such that the coil will fill slowly, say in half a minute. The steam pipe 11 has a branch 11ᵃ which is connected to the water pipe 20, between the valve 21 and the conduit $e$, and in the branch pipe is arranged a valve 22, which is normally closed by a spring (not shown). A lever 23, pivotally connected to the top of the tank by a pin 24, is connected at one end to the stem 25 of the valve by a link 26, and the opposite end of the lever has an arm 23ᵃ, which projects through a slot 27 in the back of the housing 15. When a crate of bottles is pushed rearwardly into said housing and over the spray head $d$, the crate bears against the arm 23ᵃ of the lever and rocks the lever so as to open the steam valve 22, thus admitting steam from the pipe 11 to the water pipe 20. The steam then passes downwardly through said pipe to the coil or chamber $e$ and drives the water from the coil up through the spray head $d$, from which it is sprayed into the bottles and also against the deflectors 17, the water from the deflectors dripping over the bottles and rinsing their exteriors. When the water which has accumulated in the coil or chamber $e$ has been driven out of said chamber, steam flows therethrough to the spray head $d$ and thence into and around the bottles in the chamber 15, thus sterilizing the bottles. The steam will continue to flow until the operator removes the bottle holding crate from the housing 15, when the lever 23 will rock and close the steam valve 22. The steam admitted to drive the water from the coil or chamber $e$ supplies heat to the water in the tank to maintain the water at the proper temperature for washing the bottles placed over the spray head $b$.

To facilitate handling the bottle crates, a slide plate $f$ is removably supported upon the tank in front of the spray heads and housings. In the operation of the apparatus, the pump is rotated constantly and hence jets of the washing solution from the tank constantly flow from the spray head $b$. The operator takes a crate of dirty bottles, places it on the slide plate $f$ and pushes it into the housing 10 over the washing spray head. After the bottles have been washed, the crate is removed from the housing 10, slid to the right on the slide plate $f$ and then pushed into the housing 15 over the spray head $d$. The crate rocks the lever and opens the steam valve 22, and the fresh water which has accumulated in the coil $e$ and which has become heated by the washing water in the tank, is sprayed into and around the bottles, and this water spray is followed by steam which sterilizes the bottles. While the bottles in one crate are being rinsed and sterilized, the operator places another crate of bottles in the washing chamber 10, and while the bottles in this crate are being washed, he removes the crate of bottles from the rinsing chamber and the steam valve then automatically closes and the coil $e$ fills with fresh water, which is driven out by the steam when the next crate is pushed into the sterilizing chamber.

What I claim is:

1. The combination with a tank adapted to contain washing liquid, a washing spray-head adapted to drain into the tank and means for forcing liquid from the tank through the spray-head, of a rinsing spray-head, a conduit submerged in the tank and communicating with said latter head, means for admitting a restricted flow of water from a source outside the tank to said conduit to slowly fill the same, and means for admitting steam to said conduit at intervals.

2. The combination with a tank adapted to contain washing liquid, a washing spray-head adapted to drain into the tank and means for forcing liquid from the tank through the spray-head, of a rinsing spray-head, a conduit submerged in the tank and connected to said latter head, means for admitting a restricted flow of water from a source outside the tank to said conduit to slowly fill the same, a steam pipe communicating with said conduit, a normally closed valve in said pipe, and a member for opening said valve arranged adjacent said rinsing spray-head and adapted to be operated by a bottle-holding crate when the crate is placed over said latter head.

3. The combination with a tank adapted to contain washing liquid, a washing spray-head adapted to drain into the tank and means for forcing liquid from the tank through the spray-head, of a rinsing spray-head, a conduit submerged in the tank and connected to said latter head, a water pipe for conveying water from a source outside the tank to said conduit, a valve in said pipe for restricting the flow of water so that the conduit will fill slowly, a steam pipe connected to the water pipe between said valve and conduit, and a valve for opening and closing the passageway in the steam pipe.

4. The combination with a tank adapted to contain washing liquid, a washing spray-head adapted to drain into the tank and means for forcing liquid from the tank through the spray-head, of a rinsing spray-head, a conduit submerged in the tank and connected to said latter head, a water pipe for conveying water from a source outside the tank to said conduit, a valve in said pipe for restricting the flow of water so that the conduit will fill slowly, a steam pipe connected to the water pipe between said valve and conduit, a normally closed valve in said steam pipe, and a member for opening said latter valve arranged adjacent said rinsing spray head and adapted to be operated by a bottle-holding crate when the crate is placed over the latter head.

In testimony whereof I hereunto affix my signature.

LOUIS ROSENFELD.